United States Patent
Andersen et al.

(10) Patent No.: US 6,778,925 B2
(45) Date of Patent: Aug. 17, 2004

(54) APPARATUS AND METHOD FOR CALIBRATION OF SCAN POSITION FOR A PERIPHERAL DEVICE WITH DOCUMENT FEEDER

(75) Inventors: Eric L. Andersen, Meridian, ID (US); Mark M. Josephsen, Boise, ID (US); Anthony G Laidlaw, Boise, ID (US)

(73) Assignee: Hewlett-Packard Development Company, LP, Houston, TX (US)

( * ) Notice: Subject to any disclaimer, the term of this patent is extended or adjusted under 35 U.S.C. 154(b) by 0 days.

(21) Appl. No.: 10/455,124

(22) Filed: Jun. 5, 2003

(65) Prior Publication Data

US 2003/0208331 A1 Nov. 6, 2003

Related U.S. Application Data

(63) Continuation of application No. 09/848,850, filed on May 3, 2001.

(51) Int. Cl.[7] .......................... G01C 17/38; G01P 21/00
(52) U.S. Cl. ........................................................ 702/94
(58) Field of Search ........................... 702/94, 85, 105; 358/406, 488, 498; 250/559.29, 559.3; 399/371, 205, 177, 15, 72

(56) References Cited

U.S. PATENT DOCUMENTS

| | | | | |
|---|---|---|---|---|
| 5,091,654 A | * | 2/1992 | Coy et al. | 250/559.29 |
| 5,280,368 A | * | 1/1994 | Fullerton | 358/474 |
| 5,642,202 A | * | 6/1997 | Williams et al. | 358/406 |
| 5,895,928 A | * | 4/1999 | Kerschner | 250/559.37 |
| 6,016,207 A | * | 1/2000 | Wield | 358/406 |
| 6,327,047 B1 | * | 12/2001 | Motamed | 358/1.15 |
| 2002/0054384 A1 | * | 5/2002 | Motamed | 358/504 |

* cited by examiner

*Primary Examiner*—John Barlow
*Assistant Examiner*—Demetrius R. Pretlow

(57) ABSTRACT

An apparatus and method for calibrating a peripheral device having a scanner and document feeder is provided. A target page is printed having a target at a known location on the page. The target page is then fed into the document feeder for scanning by the scanner. A calibration value is determined by determining the lateral position of the scanned target within the scanner. The calibration value is then used to adjust the lateral position of a scan line window width of the scanner to scan substantially only the entire width of a document page to be scanned.

2 Claims, 4 Drawing Sheets

APPARATUS AND METHOD FOR CALIBRATION OF SCAN POSITION FOR A PERIPHERAL DEVICE WITH DOCUMENT FEEDER

CROSS-REFERENCE TO RELATED APPLICATION

This is a continuation of U.S. patent application Ser. No. 09/848,850, filed May 3, 2001, which is hereby incorporated by reference in its entirety into the present disclosure.

BACKGROUND OF THE INVENTION

The present invention relates generally to peripheral devices, and more particularly to an apparatus and method for calibrating an image-capturing peripheral device that is associated with a document feeder.

Image-capturing peripherals such as scanners have become increasingly valuable, affordable and common devices for homes and businesses. These devices are useful for capturing and storing images such as text, graphic or pictorial images contained on documents. Various types of scanners include flatbed, drum and handheld scanners. With a flatbed scanner, one of the most common types of scanners, a document to be scanned is typically placed onto a scanning bed of the scanner, where a scanning head or sensor moves underneath the document to capture the image contained on the document. The image in digital form can then be transmitted to a connected computer, but it may instead be transmitted directly to another peripheral such as a printer or facsimile machine.

To scan a quantity of documents, an automatic document feeder, or ADF, is often combined with the scanner to feed documents. Each document can be moved past a stationary scanning head, which scans the images on the document as it passes over the scanning head, or the document can be placed on the scanning bed, where the scanning head moves relative to the document. To feed a document or documents for scanning with the document feeder, a user places the document into a tray having a pair of side guides for centering the document, although a single side alignment with a fixed edge may also be used in the tray.

Because the scanning head typically has a scan line window having a width that can be narrowed laterally and moved relative to a wider scan line width, it is desirable to adjust the lateral position of the scan line window to scan only the width of the document pages fed by the document feeder for accurate image capture. However, the side guides may not properly laterally align the document to be fed with the scan line window width of the scanning head, due to manufacturing tolerances in the document feeder. Also, because a paper path of the document feeder is typically narrower than the scanning bed width, the document feeder has room to laterally shift after assembly, contributing to the misalignment. This misalignment makes it difficult to accurately set the lateral position of the scan line window width.

To laterally align the document feeder, manual adjustments to the document feeder can be performed during assembly. A preprinted calibration sheet may be fed into the scanner, where the scanned image is compared with a stored image. Based upon the lateral offset, an operator mechanically adjusts the document feeder. However, these adjustments are labor-intensive, expensive and require tools. In addition, because the document feeder is replaceable, these manual adjustments may have to be duplicated when a document feeder is replaced or moved.

An additional method of correcting misalignment is that of calibrating the scanner via software. U.S. Pat. No. 5,813,771 to Ur et al., directed primarily to improving fill-in of digital forms, discloses a method for calibrating a printer/scanner by scanning a preprinted sheet with a document feeder to make a first image in digital form, printing the first image on a sheet using a printer to be calibrated, scanning the printed sheet to generate a second image stored in digital form, comparing the images to determine a transformation, and storing parameters of the transformation. However, this calibration method requires a costly preprinted calibration sheet and additional processing resources to transform the images, and does not adequately address lateral misalignment of the document feeder.

It would be desirable to calibrate a scanner for an associated document feeder in the field, and to adjust a scan line window width of the scanner for not only the document to be scanned but also for the document feeder, so that the scan line window scans substantially only the width of the document pages fed by the document feeder.

BRIEF SUMMARY OF THE INVENTION

The improved apparatus and method of the present invention helps calibrate a peripheral device having a document feeder that feeds document pages to be scanned, and a scanning head capable of scanning at least a predetermined scan line window width that can be laterally adjusted relative to a wider scanable width. In one embodiment, the method includes the steps of feeding a target page having a target at a known location into the document feeder so that the target page can be scanned by the scanner, scanning the target on the target page, determining a calibration value for the document feeder from the lateral position of the scanned target, and adjusting the lateral position of the predetermined scan line window width using the calibration value to scan substantially only the entire width of a document to be scanned.

Preferably, the peripheral device includes or is connected to a printer. In this way the method may further include printing the target page by printing a predetermined target at a known location on a page. The target page with the printed target is then fed into the document feeder.

The predetermined target is preferably stored within firmware or software within the printer or a connected device. The known location of the target is preferably at the center of the target page, though it may also be at the edge or elsewhere on the target page.

A peripheral device is disclosed that includes a scanner function and a document feeder that feeds document pages to be scanned, and is capable of automatically adjusting the lateral position of a predetermined scan line window width so that it is substantially coextensive with the width of a document page fed by the document feeder. In one embodiment, the peripheral device includes a scanning sensor extending substantially across the width of the scanning bed capable of producing electrical signals for a multiplicity of pixels, including signals for at least a first predetermined scan line window width that is less than the scanable width of the scanning sensor, and a processor for receiving the electrical signals from the scanning sensor and producing a data file for an image scanned by the scanning sensor. The processor is configured to analyze the electrical signals received after a page has been fed for scanning, determine the lateral location of the page relative to the scanning sensor, and determine a calibration value for the document feeder from the determined lateral position of the page. The processor is further configured to use the calibration value and produce a data file by selectively using only electrical signals corresponding to the width of the scanned page.

The improved apparatus and method allows the peripheral device to be calibrated without the need for a preprinted calibration sheet, processing resources for image comparison or manual input of a calibration value. The peripheral device can be calibrated in the field after installation or adjustment of a new document feeder, with little assistance required from an operator.

DETAILED DESCRIPTION

Figure 1:
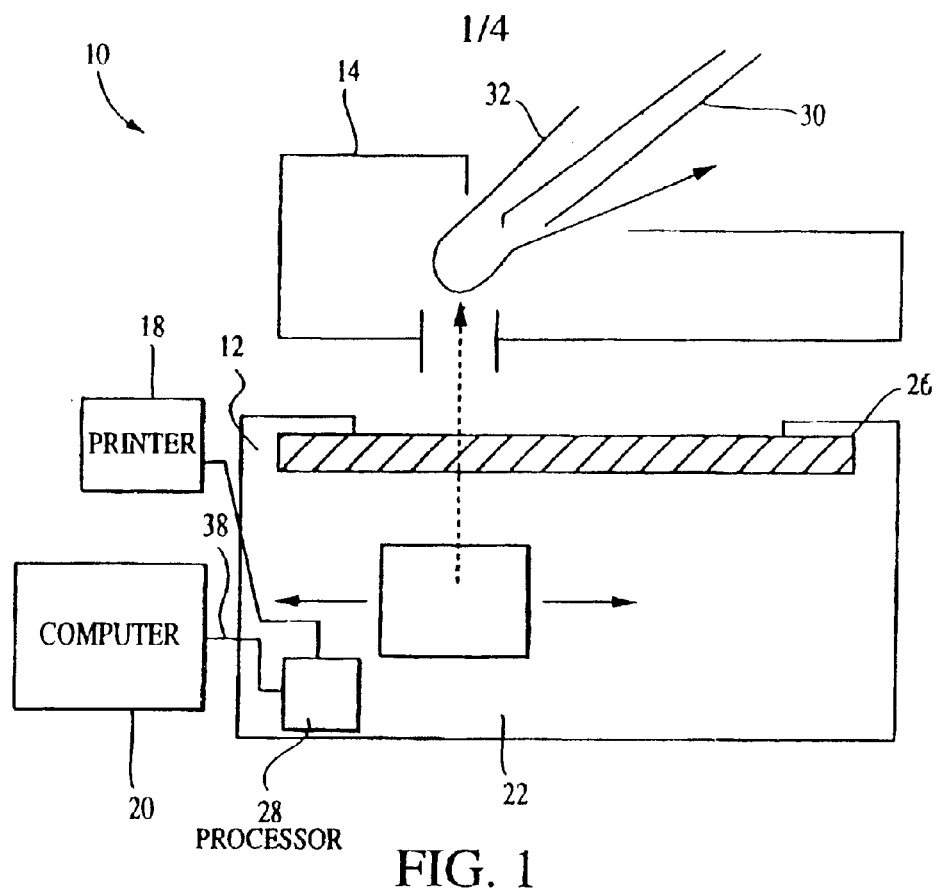
FIG. 1 is a side elevation view of a typical peripheral device partially in cross-section.
Figure 2:
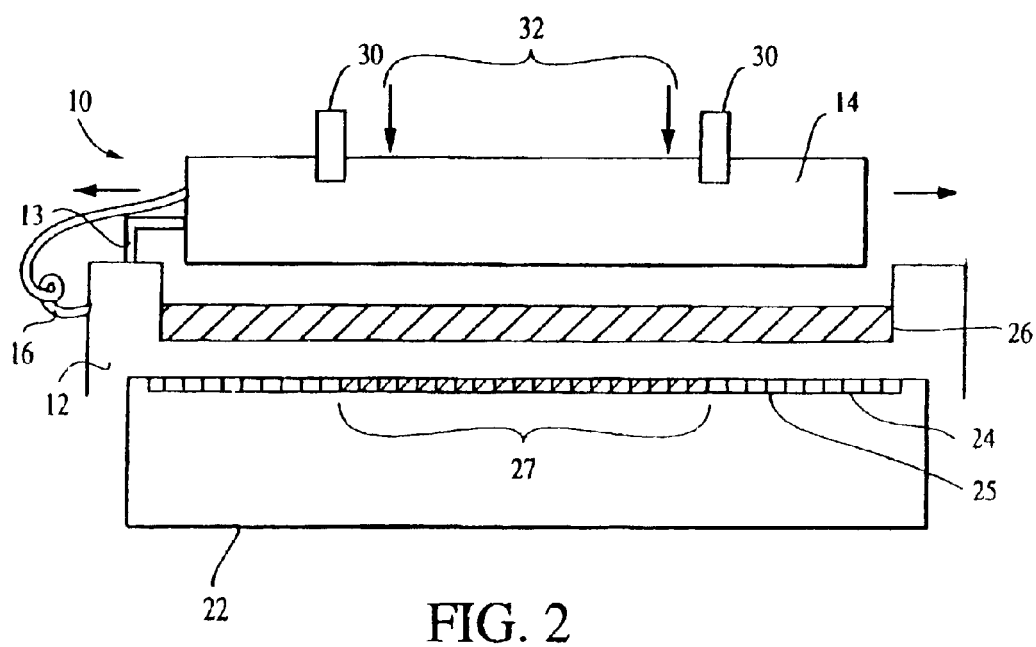
FIG. 2 is an end view of the peripheral device of FIG. 1.

Turning now to the drawings, and particularly to FIGS. 1 and 2, a peripheral device is shown and indicated generally at 10. The peripheral device 10 includes a scanner 12 associated with a document feeder 14, the peripheral device 10 being interconnected using a known connection device, represented in this exemplary embodiment as a cable 16, shown in FIG. 2. The peripheral device 10 may include a connected printer 18, and may also be connected to a computer 20 using a known connection device 38.

Figure 4:
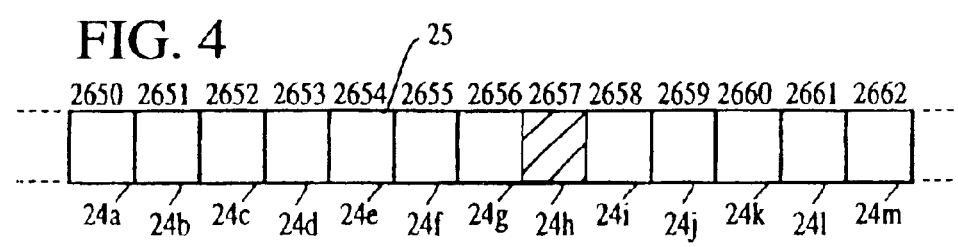
FIG. 4 is a simplified illustration of a portion of a scanner pixel range showing an activated pixel.
Figure 5:
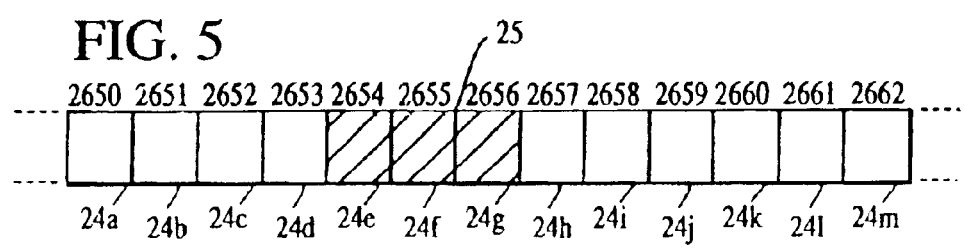
FIG. 5 is a simplified illustration of a portion of the scanner pixel range showing a plurality of activated pixels.
Figure 6:
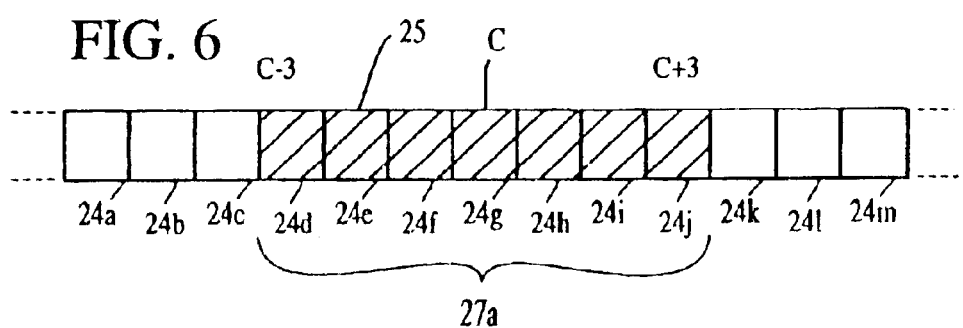
FIG. 6 is a simplified illustration of a portion of the scanner pixel range showing a sample scan line window of activated pixels.

The scanner 12 may be a typical flatbed scanner having a scanning sensor or scanning head 22, which includes a photodetector such as a charge coupled device (CCD) having a series of pixels 24 in a scan line 25, portions of which are more clearly shown by simplified illustration in FIGS. 4-6, and a scanning bed 26 typically made of glass material. Scanner 20 also includes a processor 28 for performing steps of the inventive method, but a connected processor outside the peripheral device 10, such as the computer 20, may perform steps as well.

The document feeder 14 is fitted with guides 30 for centering (for a center-justified document feeder) and feeding a document page such as a sheet of paper through a paper path 32, through which the document page passes over the scanning bed 26 and the scanning head 22 for scanning. Alternatively, the document feeder 14 may be configured so that the document page is fed onto the scanning bed 26, underneath which the scanning head 22 moves. Center justification is more advantageous for certain document feeders, but the document feeder 14 may be single-side edge-justified instead. The document feeder 14 is attached to the scanner 12 typically via hinges 13. The general construction and operation of a peripheral device of this type is well known in the art and will not be further described herein.

As shown in FIG. 2, the scanning bed 26 is wider than the paper path 32 of the document feeder 14. Due to the width differences, document feeder 14 has room to shift laterally relative to the scanning bed 26. This in turn shifts the center of the paper path 32 away from the center of a predetermined scan line window 27 of the scanning head 22, resulting in inaccurate scanning or even cropping of the image contained on the document page. For example, the scanning bed 26 may have a width of 5220 pixels, while the document feeder 14 may have a width of only 5100 pixels.

The scanable width of the scanning head 22 is typically larger than that of the scanning bed 26, for example, 5350 pixels. The width of the predetermined scan line window 27 can be laterally adjusted relative to this wider scanable width by selectively interpreting only the electrical signals from the pixels in the predetermined scan line window for the width of the document page being scanned.

Figure 3:
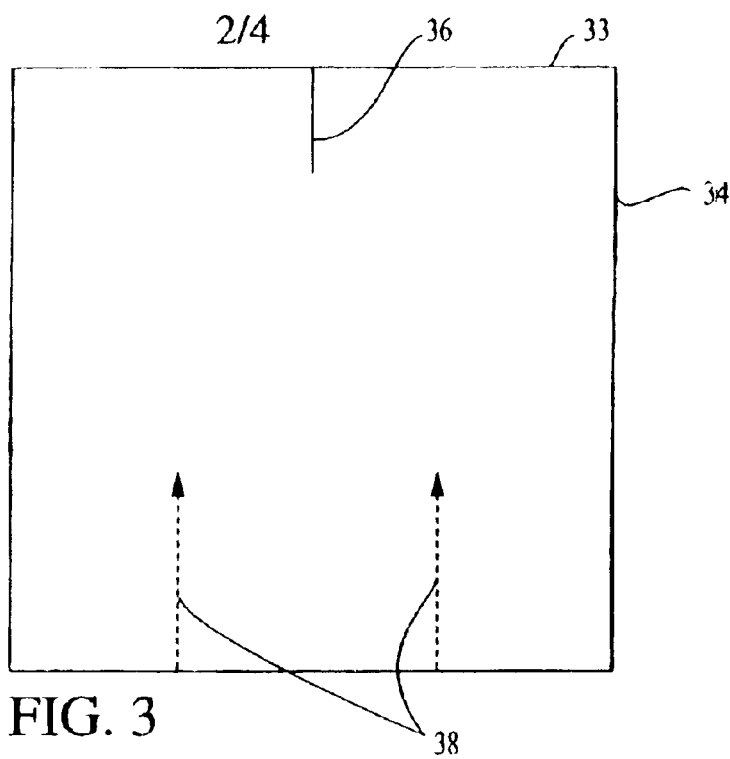
FIG. 3 shows a sample target page and target used in an embodiment of the present invention.
Figure 7:
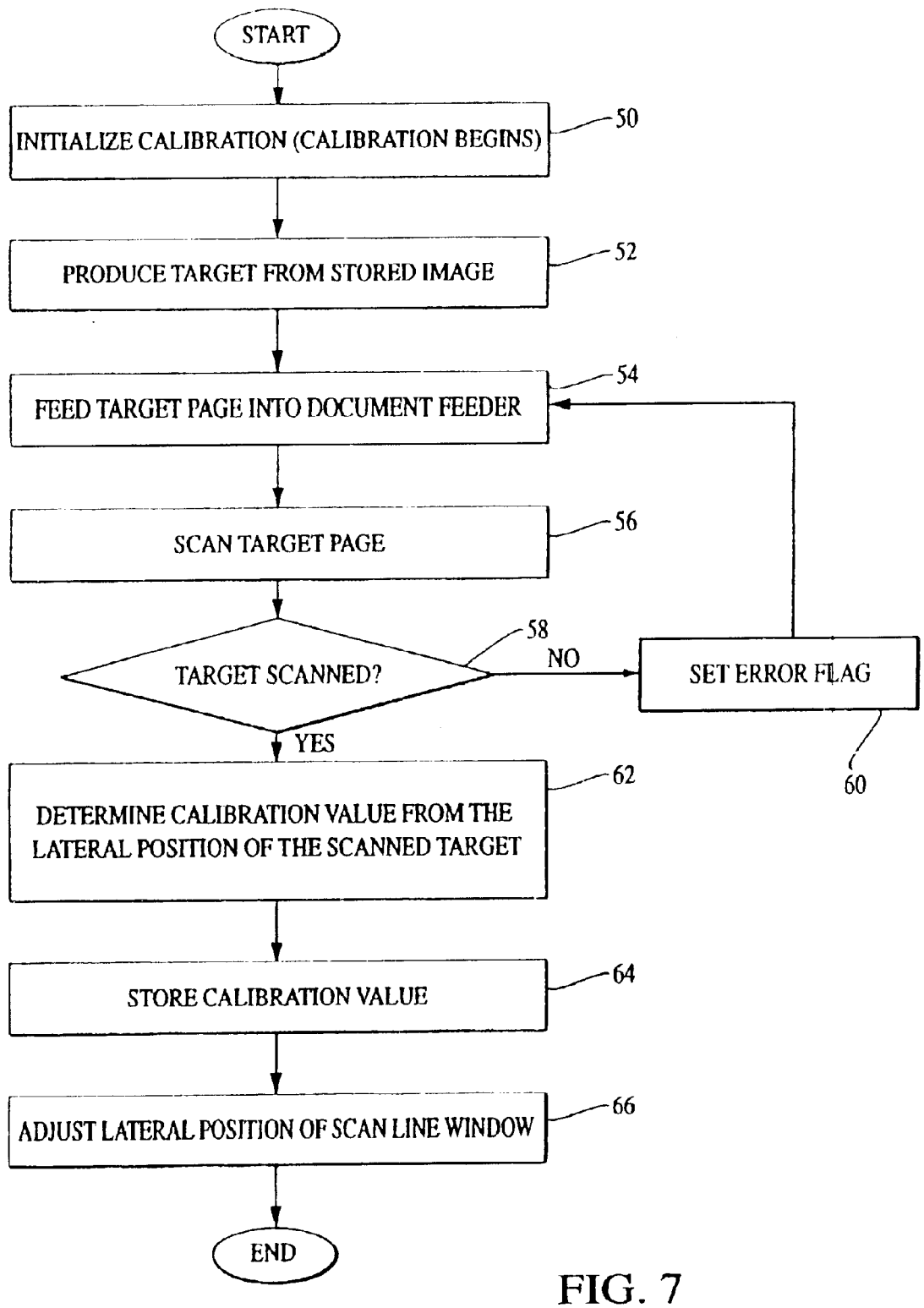
FIG. 7 is a flow chart of a method for calibrating the scanner for a document feeder; and, FIG. 8 is a flow chart of a method for adjusting a scan line window width for a document fed by the document feeder.

To accurately adjust the lateral position of the predetermined scan line window 27, a method is provided and shown by example in FIG. 7. After initialization of calibration (step 50) a target page 34 is produced (step 52) for feeding into the document feeder 14 to be scanned by the scanner 12. A typical target page 34, shown in FIG. 3, contains a predetermined target 36 at a known location. The printer 18 is preferably used to print the target page 34 from a target image stored within the processor 28 of the scanner 12. The target 36 is preferably a substantially laterally centered vertical line. If the printer 18 is a laser printer, for example, it is able to locate the center of the target page 34 for printing a target 36 with great positional accuracy. Thus, this target 36 can be considered to be at a known location at the center of the target page 34. Edge-aligned targets at known locations may be more accurately printed for inkjet and other printers. The target 36 is preferably at a leading edge 33 of the target page 34 so that it is scanned before skew occurs, in which lateral shifting occurs further down the target page as it is fed by the document feeder 14. In addition to the target 36, guiding arrows 38 may be printed on the target page 34 for guiding the feeding of the target page into the document feeder 14.

The operator therefore may print a target page 34 in the field instead of using a pre-produced target page. An additional benefit of using the printer 18 to print a target page 34 for calibration is that misalignment resulting from the printer (typically, less than 1 mm) is substantially calibrated out, resulting in more accurate copies when using the printer, document feeder 14, and scanner 12 in combination.

Once printed, an operator feeds the target page 34 (step 54) into the document feeder 14 so that the scanner 12 can scan the target page. The scanner 12, using the scanning head 22, then scans the target page 34 (step 56). The document feeder 14 may be configured to automatically feed the target page 34 for scanning and calibration once the operator feeds the target page into the document feeder, without requiring additional steps on the part of the operator such as activating a manual control. If the target 36 is not read by the scanner 12 (step 58) due to incorrect feeding of the target page 34, e.g., an error flag is set (step 60), and an operator may be instructed to reinsert the target page.

As will be appreciated by those skilled in the art, each of the pixels 24 of the scanning head 22 generates electrical signals responsive to the light received by the pixel. The signals are used to produce a data file representing the scanned image. Each of the pixels 24 represents a lateral position across the scan line width 25 of the scanner 12. After the target is scanned (step 58), by analyzing the data file the processor 28 determines the pixels 24 that scanned the target 36, and thus the lateral position of the target 36 (step 62). The lateral position of the target page 34 is then known as well.

As shown in the example of FIG. 4, pixel 24h has been activated (shown by hatching) as having scanned a portion of the target page 34. The lateral position of the target 36 is thus the lateral position of pixel 24h, or pixel 2657. In FIG. 5, a number of pixels 24e-24g have been activated, representing a wider target 36, for example. The processor then determines the lateral center of the activated pixels 24e-24g to be the lateral position of the target 36, which in FIG. 5 is pixel 24f, or pixel 2655. The lateral position of the target 36 or the target page 34 may be determined through other methods known in the art using the scanned target page 34. A calibration value representing the lateral position of the target page is stored in the processor 28 (step 64) for adjusting the scan line window width in later scan jobs. In the example of FIG. 4, a calibration value derived from pixel position 2657 may be stored.

Figure 8:
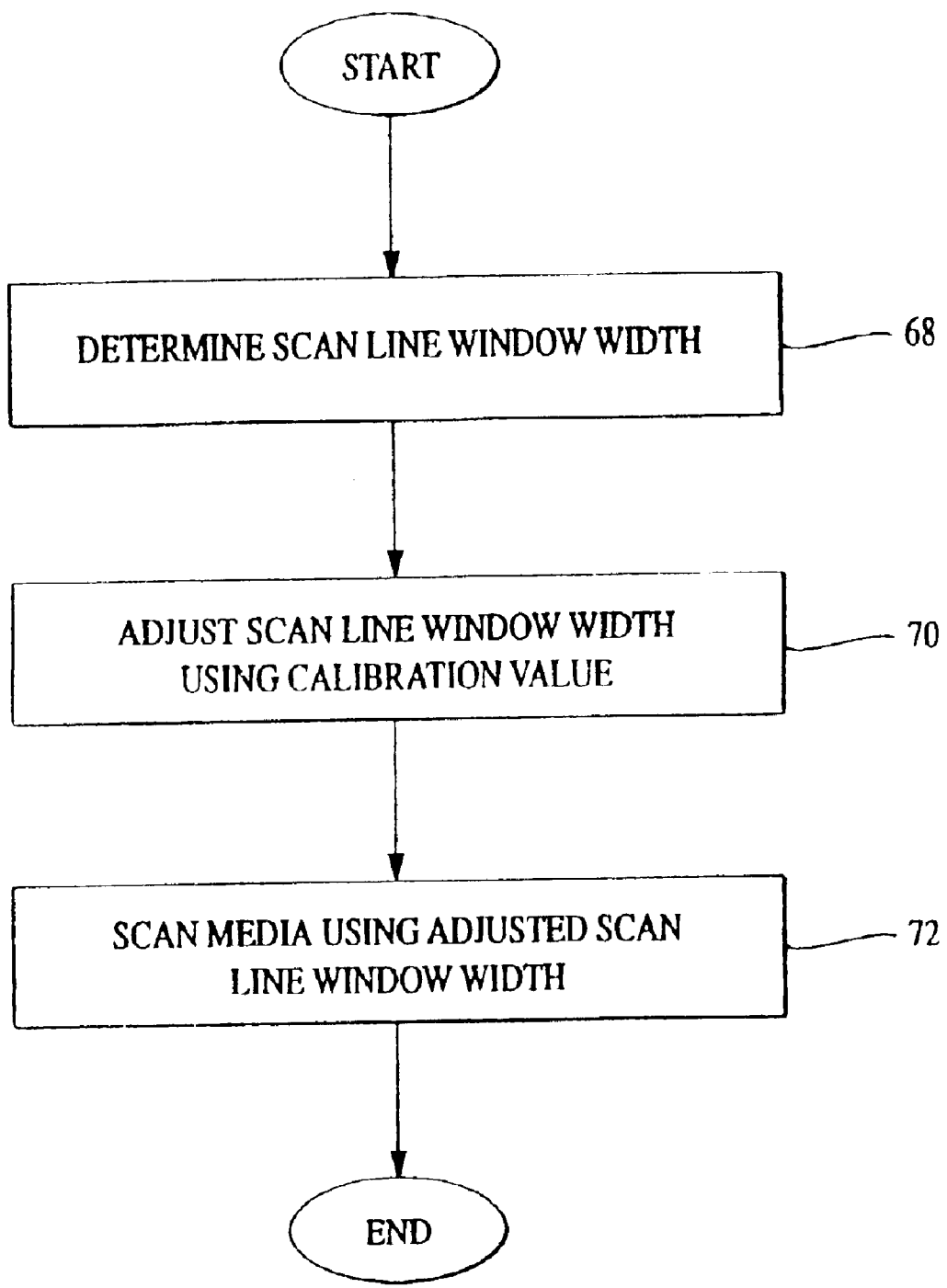

The lateral position of the scan line window 27 is then adjusted from the calibration value (step 66). In an exemplary method for adjusting this lateral position shown in FIG. 8, the processor 28 determines a scan line window width in pixels (step 68). Next, starting with the calibration value, shown as C in FIG. 6, the processor 28 creates an adjusted scan line window 27a (shown as hatched pixels) to be centered at the calibration value (step 70) by extending substantially equal portions of the scan line window width from the calibration value in either lateral direction. In FIG. 6, the width of the adjusted scan line window 27a is seven pixels, with pixel C as its center. A new document is then scanned (step 72), with the processor 28 selectively only using electrical signals corresponding to the adjusted scan line window 27a, which is substantially coextensive with the width of the scanned page. Because the adjusted scan line window 27a is centered to the document feeder 14, this method creates a scan line window width that accounts for lateral misalignment in the document feeder 14, so that the scanner 12 scans substantially only the entire width of the document. Lateral adjustments for side edge-justified calibrations are also possible, and should be considered within the scope of the present invention. While the calibration method has been shown primarily for a monochromatic scanner, it will be appreciated that the method may also be used to calibrate color scanners.

The inventive method may be implemented via a software or firmware upgrade to the peripheral device 10, and preferably no mechanical upgrades are necessary. The method may be configured to be activated when a document feeder 14 is attached or re-attached, or selectively at the request of an operator. The calibration method is preferably substantially automatic. Once initialized, the target page 34 can be printed automatically. Once the operator feeds the printed target page 34 into the document feeder 14, the method can be carried out without further assistance from the operator. Necessary mechanical adjustments to the document feeder 14 are reduced from prior methods, and the peripheral device 10 is accurately calibrated at reduced expense to an operator.

While various embodiments of the present invention have been shown and described, it should be understood that other modifications, substitutions and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. An article for calibrating a peripheral device of the type which, has a document feeder that feeds document pages onto a scanning bed and a scanning head that is capable of scanning at least a first predetermined scan line window width that can be laterally adjusted relative to a wider scanable width, the apparatus comprising:

a computer program product comprising a computer usable medium having computer readable program code embodied in the medium that when executed causes the apparatus to:
print a stored target onto a target page, the target being printed onto the target page at a known location;
feed the target page so that the target page can be scanned by the scanner;
scan the target on the target page;
determine a calibration value for the document feeder from the lateral position of the scanned target; and,
adjust the lateral position of the scan line window width using the calibration value to scan substantially only the entire width of the document.

2. A peripheral device that includes a scanner function, and being of the type which has a document feeder that feeds document pages to be scanned, said device being capable of automatically adjusting the lateral position of a predetermined scan width to be substantially coextensive with the width of a document page fed by the document feeder, said device comprising:

a scanning sensor that extends substantially across the width of the scanning bed and is capable of producing electrical signals for a multiplicity of pixels, including signals for at least a first predetermined scan width that is less than the width of the scanning sensor;

a processor for receiving the electrical signals from the scanning sensor and producing a data file for an image scanned by the scanning sensor;

said processor analyzing the electrical signals received after a page has been fed onto the scanning bed, and determining the lateral location of the page relative to the scanning bed;

said processor determining a calibration value for the document feeder from the determined lateral position of the page;

said processor using said calibration value and producing a data file by selectively using only electrical signals corresponding to the width of the document page.

* * * * *

UNITED STATES PATENT AND TRADEMARK OFFICE
CERTIFICATE OF CORRECTION

PATENT NO.    : 6,778,925 B2
DATED         : August 17, 2004
INVENTOR(S)   : Eric L. Andersen et al.

It is certified that error appears in the above-identified patent and that said Letters Patent is hereby corrected as shown below:

Column 6,
Line 11, after "which" delete the comma

Signed and Sealed this

Nineteenth Day of April, 2005

JON W. DUDAS
*Director of the United States Patent and Trademark Office*